United States Patent [19]
Wahl et al.

[11] Patent Number: 5,696,585
[45] Date of Patent: Dec. 9, 1997

[54] APPARATUS AND METHOD FOR EFFICIENT ELECTROSTATIC DISCHARGE ON GLASS DISKS IN FLYING HEIGHT TESTERS

[75] Inventors: Michael Wahl; Kenneth H. Womack, both of San Diego, Calif.

[73] Assignee: Phase Metrics, San Diego, Calif.

[21] Appl. No.: 766,900

[22] Filed: Dec. 13, 1996

[51] Int. Cl.[6] .................... G01B 9/02; G11B 33/14; G01J 5/60
[52] U.S. Cl. .................... 356/357; 360/103; 360/97.02
[58] Field of Search ............... 360/97.02, 103; 356/357, 243

[56] References Cited

U.S. PATENT DOCUMENTS

| | | | |
|---|---|---|---|
| 5,218,424 | 6/1993 | Sommargren | 356/357 |
| 5,285,337 | 2/1994 | Best et al. | 360/103 |

*Primary Examiner*—Frank G. Font
*Assistant Examiner*—Amanda Merlins
*Attorney, Agent, or Firm*—Blakely, Sokoloff, Taylor & Zafman

[57] ABSTRACT

An electrostatic discharge device for a flying height tester which measures the air gap of a recording head. The tester includes a transparent disk that is rotated by a spindle motor. The spindle motor is mounted to a spin stand. The tester has a manifold that is mounted to the spin stand and directs a flow of ionized fluid to a bottom surface of the disk. The manifold is also electrically grounded. The ionized fluid and electrically grounded manifold provide an electrical path that discharge electrostatic charge located on the bottom surface of the disk. The manifold extends from an inner disk diameter to an outer disk diameter so that ionized fluid is introduced to the entire bottom surface of the rotating disk. Additionally, the manifold location is such that the ionized fluid provides an electrical path from the disk to the manifold that is relatively constant across the surface of the disk. The manifold location insures that the electrostatic charge is discharged from the entire bottom surface of the disk. The manifold is also grounded by a fixed wire to provide a reliable ground path for the device.

17 Claims, 2 Drawing Sheets

APPARATUS AND METHOD FOR EFFICIENT ELECTROSTATIC DISCHARGE ON GLASS DISKS IN FLYING HEIGHT TESTERS

BACKGROUND OF THE INVENTION

1. Field of the Invention

The present invention relates to a device for discharging electrostatic charge from a Glass disk of a flying height tester used to measure an air gap between the disk and a magnetic recording head.

2. Description of Related Art

Hard disk drives contain magnetic recording heads which store and read information from a rotating disk(s). Each head is integrated into a slider which has hydrodynamic surface features that create an air bearing between the head and the surface of the disk. The air bearing prevents mechanical wear between the head and the disk.

It is desirable to minimize the thickness of the air bearing to optimize the magnetic coupling between the head and the disk. Sliders are therefore designed to create an air bearing which operates between a minimum and a maximum thickness. To insure compliance with such design criteria the recording heads are typically tested in an apparatus commonly referred to as a flying height tester.

Flying height testers include a loader mechanism that places a slider adjacent to a bottom surface of a rotating transparent disk. The slider is separated from the rotating disk by an air gap. The tester also contains an optical system which directs a light beam through the transparent disk and onto the slider. The light is reflected from the slider/disk interface into a detector. The detected reflected light beam is then processed using a multiple beam interference expression to compute the thickness of the air gap.

It has been found that electrostatic charge will accumulate on the surface of the glass disk. The electrostatic charge may discharge onto the slider and damage the recording head. The magneto-resistive (MR) element of an MR head is particularly sensitive to electrostatic discharge (ESD).

FIG. 1 shows a flying height tester 2 of the prior art which generates ionized air 3 to discharge electrostatic charge from a disk 5. The disk 5 is rotated by a spindle motor 6 that is mounted to a spin stand 7. The ionized air 3 is blown across the bottom of the disk 6 by an air source (not shown). The air contains positive and negative charged ions which facilitate the removal of the electrostatic charge from the disk 5.

The spinning disk 5 creates an air flow that pushes the ionized air away from the inner diameter of the disk 5. Consequently, much of the ionized air 3 does not reach the inner disk diameter to discharge the electrostatic charge at the inner portion of the disk 5.

The uniformity of discharge is also affected by the arrangement of equipotential surfaces in the vicinity of the glass disk, including the spindle motor 6 which is typically grounded through internal bearings and an external carbon brush 8. Changes over time may occur to the ground path as the electrical resistance of the bearings and external brush 8 vary during the operation of the tester 2. This variation of resistance over time reduces the reliability of the ESD system.

Another factor affecting the uniformity of discharge involves the greater distance of the outer track of the disk from the spindle motor 7 as compared with the inner track. The sliders are typically loaded onto the outer disk diameter during a test routine. The outer disk diameter may have residual charge that is discharged onto the slider instead of the spindle motor 6. It would be desirable to provide an electrostatic discharge device for a flying height tester that overcomes the various contributions to nonuniformity of discharge cited above.

SUMMARY OF THE INVENTION

The present invention is an electrostatic discharge device for a flying height tester which measures the air gap of a recording head. The tester includes a transparent disk that is rotated by a spindle motor. The spindle motor is mounted to a spin stand. The tester has a manifold that is mounted to the spin stand and directs a flow of ionized fluid to the bottom surface of the disk. The manifold or shield covering the outer surface of the manifold is also electrically grounded. The ionized fluid and electrically grounded manifold provide an electrical path that discharge the electrostatic charge located on the bottom surface of the disk. The manifold extends from an inner disk diameter to an outer disk diameter so that ionized fluid is introduced to the entire bottom surface of the disk as the disk rotates.

Additionally, the manifold location provides an electrical path from the disk to the manifold that is relatively constant across the surface of the disk.

The manifold location insures that the charged particles are discharged from the entire bottom surface of the disk. The manifold is also grounded by a fixed wire to provide a reliable ground path for the device.

DETAILED DESCRIPTION OF THE INVENTION

Figure 1:
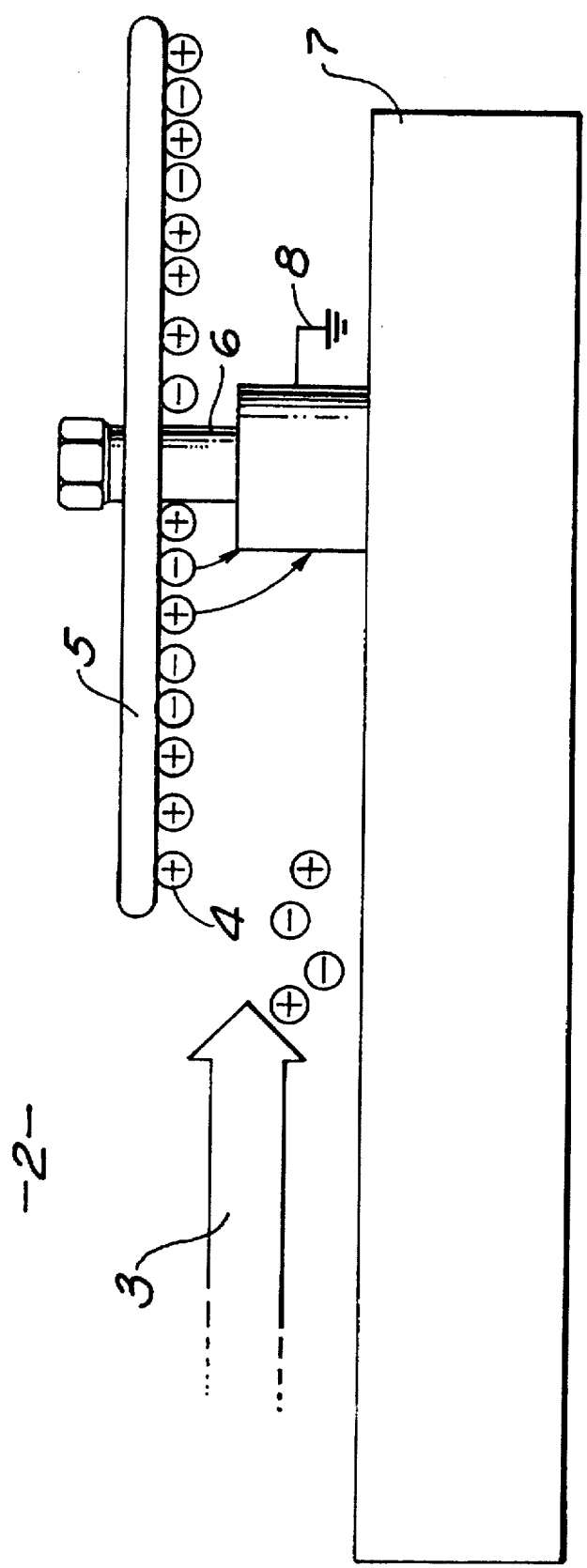
FIG. 1 shows an electrostatic discharge device of the prior art.
Figure 2:
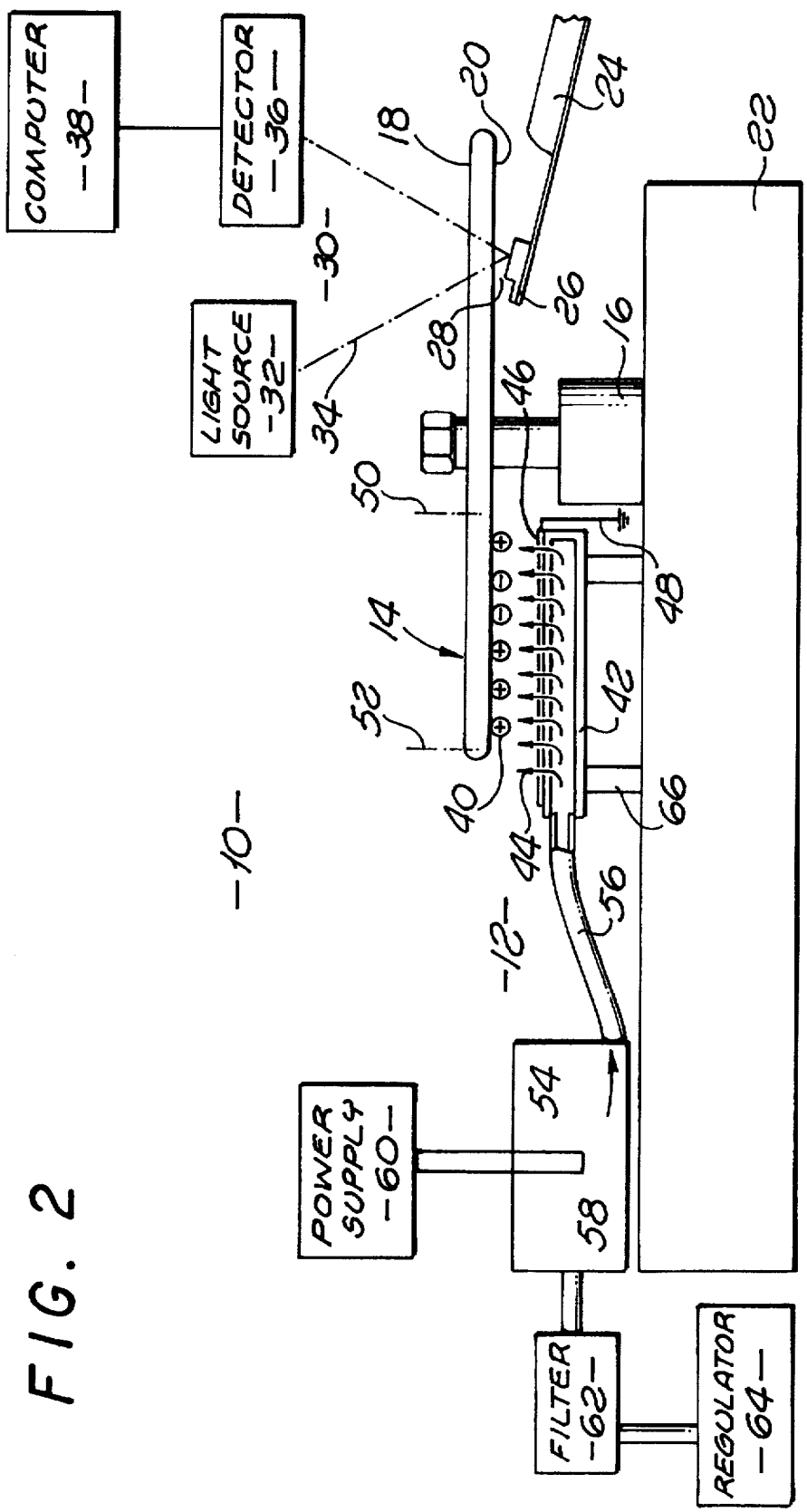
FIG. 2 shows an electrostatic discharge device of the present invention.

Referring to the drawings more particularly by reference numbers, FIG. 2 shows a flying height tester 10 which has an electrostatic discharge device 12. The flying height tester 10 contains a transparent disk 14 that is rotated by a spindle motor 16. The disk 14 has a top surface 18 and a bottom surface 20. The spindle motor 16 is mounted to a spin stand 22.

The tester 10 has a loader mechanism 24 which moves a recording head 26 adjacent to the bottom surface 20 of the disk 14. The recording head 26 is part of a head gimbal assembly (HGA) that is eventually mounted to an actuator arm of a hard disk drive. The recording head 26 is separated from the disk 14 by an air gap 28.

The tester 10 has an optical system 30 that measures the thickness of the air gap 28. The optical system 30 includes a light source 32 that directs a light beam 34 through the transparent disk 14 and onto the head 26. The beam 34 is reflected from the recording head 26 into a detector 36. The detector 36 is coupled to a computer 38 which computes the air gap thickness from the detected reflected light beam 34. The flying height measuring system may be a product, or modified product, sold by Phase Metrics, Inc. of San Diego, Calif., the assignee of the present invention.

The bottom surface 20 of the disk 16 may accumulate electrostatic charge 40. The discharge device 12 discharges the electrostatic charge 40 to prevent damage to the head 26. The device 12 includes a manifold 42 that directs a flow of ionized fluid 44 toward the bottom surface 20 of the disk 16.

The manifold 42 is electrically grounded. In the preferred embodiment, the manifold 42 has a grounded plate or shield 46 that is mounted close to the disk and is grounded through a ground wire 48. The ground wire 48 provides a reliable ground path for ions from the ionized fluid 44 that are attracted by the ground plate 46.

The ionized fluid 44 and grounded manifold 42 provide an electrical path that discharges the electrostatic charge 40 from the disk 16. The manifold releases positive and negative ions of equal amounts of which some will move to the disk and neutralize the electrostatic charges while all others move to any grounded surface in the immediate vicinity. The manifold 42 extends from an inner disk diameter 50 to an outer disk diameter 52. The location of the manifold 42 insures that ionized fluid 40 is provided to the entire area of the disk 16. Additionally, the location of the grounded manifold 42 provides an electrical discharge path that is constant across the surface of the disk 16. The location of the manifold 42 therefore insures a discharge of electrostatic charge across the entire radius of the disk 16.

The manifold 42 may be coupled to an ionization chamber 54 by a hose 56. The ionization chamber 54 ionizes a fluid that flows through the chamber 54 and into the manifold 42. In the preferred embodiment, the ionization chamber 54 has two tunsten tips 58 that are connected to the positive and negative terminal of a power supply 60. The power supply 60 creates a relatively high electric field at the tungsten tips 58 which ionizes the fluid flowing across the tip 58. The power supply 60 may be variable so that the operator can change the ionization level of the fluid and the balance between positive and negative ions.

The ionization chamber 54 may be coupled to a filter 62 which removes impurities in the fluid. The filter 62 may be coupled to a pressure regulator 64 which allows the operator to vary the pressure and flowrate of the ionized fluid 40. The fluid may be air that is provided by an air line typically found at industrial facilities. Additionally, the manifold 42 may be supported by adjustable legs 66 which allow the operator to vary the distance between the manifold 42 and the disk 16.

In operation, the electrostatic discharge device 12 emits ionized fluid 40 to continuously discharge the rotating disk 16. An operator places a recording head 26 on the loader mechanism 24 which moves the head 26 adjacent to the disk 16. The flowrate of the ionized fluid is preferably low enough so that the ionized fluid flow does not disturb the air bearing 28 between the head 26 and the disk 16.

The discharge device 12 continuously discharges the electrostatic charge on the disk 16 so that there is no discharge onto the head 26. After the optical system 30 measures the thickness of the air gap 28, the recording head 26 is replaced with another part and the process is repeated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electrostatic discharge device for a tester that test a recording head, comprising:

a disk that contains an electrostatically charged surface;

a spindle motor that rotates said disk;

a test stand that supports said spindle motor;

a loader mechanism that moves the recording head adjacent to said disk; and, a manifold that is located between said test stand and said disk, wherein said manifold directs a flow of ionized fluid to said disk to discharge the electrostatic charge from said disk.

2. The device as recited in claim 1, wherein said manifold is electrically grounded.

3. The device as recited in claim 1, wherein said manifold has a grounded shield.

4. The device as recited in claim 1, wherein said manifold extends from an inner diameter to an outer diameter of said disk.

5. The device as recited in claim 1, further comprising an ionization chamber that is coupled to said manifold, wherein said ionization chamber creates the ionized fluid.

6. The device as recited in claim 1, further comprising a pressure regulator that controls a flowrate of the ionized fluid.

7. The device as recited in claim 1, further comprising a ground wire that is attached to said manifold.

8. A flying height tester that tests a recording head, comprising:

a disk that contains an electrostatically charged surface;

a spindle motor that rotates said disk;

a test stand that supports said spindle motor;

a loader mechanism that moves the recording head adjacent to said disk, wherein there is an air gap between the recording head and said disk;

a manifold that is located between said test stand and said disk, wherein said manifold directs a flow of ionized fluid to said disk to discharge the electrostatic charge from said disk; and, an optical system which measures the air gap between the recording head and said disk.

9. The tester as recited in claim 8, wherein said manifold is electrically grounded.

10. The tester as recited in claim 8, wherein said manifold has a ground shield.

11. The tester as recited in claim 8, wherein said manifold extends from an inner diameter to an outer diameter of said disk.

12. The tester as recited in claim 8, further comprising an ionization chamber that is coupled to said manifold, wherein said ionization chamber creates the ionized fluid.

13. The tester as recited in claim 8, further comprising a pressure regulator that controls a flowrate of the ionized fluid.

14. The tester as recited in claim 8, further comprising a ground wire that is attached to said manifold.

15. A method for removing an electrostatic charge from a rotating disk which has a top surface and an opposite bottom surface, comprising the steps of:

a) directing a flow of ionized fluid toward the disk in a direction that is essentially perpendicular to the bottom surface of the disk, wherein the ionized fluid discharges the electrostatic charge from the disk.

16. The method as recited in claim 15, wherein a portion of the electrostatic charge is discharged to an electrically grounded manifold which directs the flow of ionized fluid to the disk.

17. The method as recited in claim 15, further comprising the steps of placing a recording head adjacent to the disk so that there is an air gap between the recording head and the disk, and measuring the air gap.

* * * * *